United States Patent
Yoo et al.

(10) Patent No.: US 11,594,780 B2
(45) Date of Patent: Feb. 28, 2023

(54) BATTERY MODULE INCLUDING HEAT-SHRINKABLE TUBE

(71) Applicant: LG Chem, Ltd., Seoul (KR)

(72) Inventors: Jae-Min Yoo, Daejeon (KR); Eun-Gyu Shin, Daejeon (KR); Jeong-O Mun, Daejeon (KR); Yoon-Koo Lee, Daejeon (KR)

(73) Assignee: LG Energy Solution, Ltd.

( * ) Notice: Subject to any disclaimer, the term of this patent is extended or adjusted under 35 U.S.C. 154(b) by 226 days.

(21) Appl. No.: 16/769,479

(22) PCT Filed: Aug. 26, 2019

(86) PCT No.: PCT/KR2019/095031
§ 371 (c)(1),
(2) Date: Jun. 3, 2020

(87) PCT Pub. No.: WO2020/055219
PCT Pub. Date: Mar. 19, 2020

(65) Prior Publication Data
US 2020/0388805 A1    Dec. 10, 2020

(30) Foreign Application Priority Data
Sep. 13, 2018  (KR) .......................... 10-2018-0109834

(51) Int. Cl.
*H01M 10/00* (2006.01)
*H01M 50/24* (2021.01)
(Continued)

(52) U.S. Cl.
CPC ......... *H01M 50/24* (2021.01); *H01M 10/613* (2015.04); *H01M 10/625* (2015.04);
(Continued)

(58) Field of Classification Search
CPC .. H01M 50/24; H01M 10/613; H01M 10/625; H01M 10/647; H01M 10/653;
(Continued)

(56) References Cited

U.S. PATENT DOCUMENTS

| | | | |
|---|---|---|---|
| 3,977,906 A | * | 8/1976 | Beatty ................ H01M 50/543 429/185 |
| 2005/0208375 A1 | * | 9/2005 | Sakurai ................ H01M 50/20 429/185 |

(Continued)

FOREIGN PATENT DOCUMENTS

| | | |
|---|---|---|
| CN | 205104554 U | 3/2016 |
| CN | 205208122 U | 5/2016 |

(Continued)

OTHER PUBLICATIONS

International Search Report for PCT/KR2019/095031 dated Jan. 2, 2020; 3 pages.

(Continued)

*Primary Examiner* — Nicholas P D'Aniello
(74) *Attorney, Agent, or Firm* — Lerner, David, Littenberg, Krumholz & Mentlik, LLP

(57) ABSTRACT

A battery module having excellent cooling efficiency and allowing easy recycling of inner components at disposal applies a heat-shrinkable tube serving as a module housing and a heatsink to the battery module. The battery module includes a cell assembly including a plurality of pouch-type secondary batteries having electrode leads formed to protrude in a front and rear direction and stacked on each other in a left and right direction; a heatsink located to contact an outer surface of the cell assembly and having a coolant flow path for allowing a coolant to move therein; and a heat-shrinkable tube having a tubular shape with a hollow structure in which the cell assembly and the heatsink are located, the heat-shrinkable tube being thermally shrunken so that (Continued)

the cell assembly and the heatsink are in contact with each other.

14 Claims, 7 Drawing Sheets

(51) Int. Cl.
*H01M 10/613* (2014.01)
*H01M 10/625* (2014.01)
*H01M 10/647* (2014.01)
*H01M 10/653* (2014.01)
*H01M 10/6556* (2014.01)
*H01M 10/6567* (2014.01)
*H01M 50/502* (2021.01)
*H01M 50/105* (2021.01)

(52) U.S. Cl.
CPC ....... *H01M 10/647* (2015.04); *H01M 10/653* (2015.04); *H01M 10/6556* (2015.04); *H01M 10/6567* (2015.04); *H01M 50/105* (2021.01); *H01M 50/502* (2021.01); *H01M 2220/20* (2013.01)

(58) Field of Classification Search
CPC ......... H01M 10/6556; H01M 10/6567; H01M 50/502; H01M 2220/20; H01M 10/6554; H01M 50/20; H01M 50/50; H01M 10/6551; H01M 50/211; Y02E 60/10
See application file for complete search history.

(56) References Cited

U.S. PATENT DOCUMENTS

| | | | |
|---|---|---|---|
| 2015/0155528 A1* | 6/2015 | Takahashi | H01M 50/124 429/163 |
| 2016/0093931 A1 | 3/2016 | Rawlinson et al. | |
| 2016/0134000 A1 | 5/2016 | Lee et al. | |
| 2016/0233465 A1* | 8/2016 | Lee | H01M 50/20 |
| 2017/0194681 A1 | 7/2017 | Kim et al. | |
| 2017/0237130 A1 | 8/2017 | Kim et al. | |
| 2018/0138565 A1 | 5/2018 | Lee et al. | |
| 2018/0194235 A1 | 7/2018 | Kim et al. | |
| 2018/0331336 A1 | 11/2018 | Choi et al. | |
| 2019/0074557 A1 | 3/2019 | Shin et al. | |

FOREIGN PATENT DOCUMENTS

| | | |
|---|---|---|
| CN | 106469839 A | 3/2017 |
| CN | 107887668 A | 4/2018 |
| CN | 107925028 A | 4/2018 |
| CN | 108370075 A | 8/2018 |
| DE | 102007063194 A1 | 6/2009 |
| DE | 102011089949 A1 | 6/2013 |
| EP | 3373384 A1 | 9/2018 |
| JP | 2734519 B2 | 3/1998 |
| JP | 2000090897 A | 3/2000 |
| JP | 2003242950 A | 8/2003 |
| JP | 2005135637 A | 5/2005 |
| JP | 2006019177 A | 1/2006 |
| JP | 3915669 B2 | 5/2007 |
| JP | 2008066000 A | 3/2008 |
| JP | 2013051048 A | 3/2013 |
| JP | 5334420 B2 | 11/2013 |
| JP | 2017085695 A | 5/2017 |
| KR | 101688569 B1 | 12/2016 |
| KR | 20170021122 A | 2/2017 |
| KR | 20170036639 A | 4/2017 |
| KR | 20170046330 A | 5/2017 |
| KR | 20170095052 A | 8/2017 |
| KR | 101840417 B1 | 3/2018 |
| WO | 2015016564 A1 | 2/2015 |

OTHER PUBLICATIONS

Extended European Search Report for EP Application No. 19860740.0 dated May 14, 2021, 7 pgs.

Search Report dated Mar. 22, 2022 from Office Action for Chinese Application No. 201980006840.X dated Mar. 30, 2022. 3 pgs.

* cited by examiner

BATTERY MODULE INCLUDING HEAT-SHRINKABLE TUBE

CROSS-REFERENCE TO RELATED APPLICATIONS

The present application is a national phase entry under 35 U.S.C. § 371 of International Application No. PCT/KR2019/095031, filed Aug. 26, 2019, published in Korean, which claims priority to Korean Patent Application No. 10-2018-0109834 filed on Sep. 13, 2018 in the Republic of Korea, the disclosures of which are incorporated herein by reference.

TECHNICAL FIELD

The present disclosure relates to a battery module including a heat-shrinkable tube, and more particularly, to a battery module having excellent cooling efficiency and allowing easy recycling of inner components at disposal by applying a heat-shrinkable tube serving as a module housing and a heatsink to the battery module.

BACKGROUND ART

In recent years, the demand for portable electronic products such as notebooks, video cameras, mobile phones, or the like is rapidly increasing, and the development of electric vehicles, energy storage batteries, robots, satellites, or the like is in earnest. For this reason, high-performance secondary batteries enabling repeated charging and discharging are being actively researched.

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

The lithium secondary battery mainly uses lithium-based oxides and carbonaceous materials as a positive electrode active material and a negative electrode active material, respectively. In addition, the lithium secondary battery includes an electrode assembly in which a positive electrode plate coated with the positive electrode active material and a negative electrode plate coated with the negative electrode active material are disposed with a separator being interposed therebetween, and an exterior, namely a battery case, hermetically containing the electrode assembly together with an electrolyte.

In addition, the lithium secondary battery may be classified into a can-type secondary battery in which the electrode assembly is included in a metal can and a pouch-type secondary battery in which the electrode assembly is included in a pouch made of aluminum laminate sheets, depending on the shape of the exterior.

Among them, the pouch-type secondary battery may be used to configure a battery module that includes a module housing made of a hard material and accommodating a plurality of secondary batteries, and a bus bar assembly configured to electrically connect the plurality of secondary batteries.

In addition, in the conventional battery module, in many cases, the module housing is implemented using a plastic or metal that is a hard material. However, the module housing made of a hard material has a great difficulty in disassembling the module housing from the battery module for recycling the battery module with a defect. That is, if the process of cutting the module housing using a cutting tool is performed for recycling, the cutting tool is likely to damage or ignite the plurality of secondary batteries, which is a serious problem in safety.

Also, if the module housing of the battery module is implemented with a hard material, a gap is inevitably formed between the module housing and the plurality of secondary batteries. The air located in the gap may greatly deteriorate the cooling efficiency of the battery module. Moreover, since the empty space of the module housing have different sizes at the plurality of secondary batteries, the heat dissipation efficiency may be different for the plurality of secondary batteries, resulting in irregular thermal balance of the battery module. In this case, the life span of the battery module may be greatly reduced.

Further, in the conventional battery module, if a heatsink is provided inside the module housing separately together with the plurality of secondary batteries, a lot of free space is formed inside the module housing made of a hard material, and thus the plurality of secondary batteries and the heatsink are not easily in close contact with each other. Accordingly, the cooling efficiency through the heatsink deteriorates.

DISCLOSURE

Technical Problem

Therefore, the present disclosure is designed to solve the problems of the related art, and therefore the present disclosure is directed to providing a battery module, which may have excellent cooling efficiency and allow easy recycling of inner components at disposal by applying a heat-shrinkable tube serving as a module housing and a heatsink to the battery module.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising:

a cell assembly including a plurality of pouch-type secondary batteries having electrode leads formed to protrude in a front and rear direction and stacked on each other in a left and right direction;

a heatsink located to contact an outer surface of the cell assembly and having a coolant flow path for allowing a coolant to move therein; and a heat-shrinkable tube having a tubular shape with a hollow structure in which the cell assembly and the heatsink are located, the heat-shrinkable tube being thermally shrunken so that the cell assembly and the heatsink are in contact with each other.

Also, the heatsink may have an accommodation groove formed to be dented inward to accommodate a lower portion of each of the plurality of pouch-type secondary batteries of the cell assembly.

Moreover, an uneven structure may be formed at an outer surface of the heatsink, which faces the heat-shrinkable tube.

In addition, the heatsink may have an inlet tube for injecting a coolant and an outlet tube for discharging a coolant.

Also, the battery module may further comprise a bus bar assembly that includes: a bus bar frame located at a front side or a rear side of the cell assembly at which an electrode lead is formed, the bus bar frame having a perforation hole through which at least one electrode lead passes and protrudes, the bus bar frame having a fixing structure opened so that the inlet tube and the outlet tube of the heatsink are respectively inserted and fixed therein; and a bus bar mounted to an outer surface of the bus bar frame and having a conductive metal to electrically connect the plurality of pouch-type secondary batteries.

Further, the heat-shrinkable tube may be configured to surround a portion of the outer surface of the bus bar assembly.

In addition, a concave portion dented inward may be formed at a portion of the heat-shrinkable tube surrounding the outer surface of the bus bar assembly so that the inlet tube and the outlet tube of the heatsink are exposed outward.

Also, a plurality of embossing structures partially ridged outward may be formed at an outer surface of the heat-shrinkable tube.

Moreover, a thermally conductive adhesive may be added in the heat-shrinkable tube.

In addition, the thermally conductive adhesive may be interposed between the cell assembly and the heatsink.

Further, the thermally conductive adhesive may be interposed between the cell assembly and the heat-shrinkable tube.

In addition, in another aspect of the present disclosure, there is also provided a battery pack, which includes at least one battery module as above.

Also, in another aspect of the present disclosure, there is also provided a vehicle, which includes the battery pack.

Advantageous Effects

According to an embodiment of the present disclosure, the battery module of the present disclosure may be thermally shrunken by applying heat in a state where the cell assembly and the heatsink are accommodated inside the hollow structure of the heat-shrinkable tube, and also the thermally-shrunken outer wall of the heat-shrinkable tube may be configured such that the cell assembly and the heatsink are in close contact with each other. Thus, the spaced distance between the cell assembly and the heatsink is reduced, and the area in close contact with each other is increased, thereby realizing a uniform heat conduction distance between the two components as a whole.

In addition, according to another embodiment of the present disclosure, since the accommodation groove dented inward is formed at the outer surface of the heatsink facing the cell assembly, the plurality of pouch-type secondary batteries of the cell assembly pressurized by the outer wall of the thermally-shrunken heat-shrinkable tube may be in close contact with a wider area on the accommodation groove of the heatsink. Accordingly, the heat dissipation efficiency of the battery module may be increased, and the plurality of pouch-type secondary batteries of the cell assembly may be prevented from moving due to external impact at the outer surface of the heatsink.

Moreover, according to an embodiment of the present disclosure, since an uneven structure is formed at the outer surface of the heatsink facing the heat-shrinkable tube, the contact area between the heat-shrinkable tube and the heatsink may be effectively increased, and the heat-shrinkable tube may be fixed into the insert of the uneven structure. Accordingly, the coupling force (friction force) between the heat-shrinkable tube and the heatsink may be increased.

In addition, according to an embodiment of the present disclosure, since a fixing structure with an open portion is formed at the bus bar frame of the bus bar assembly such that the inlet tube and the outlet tube of the heatsink are inserted and fixed therein, the fixing structure of the heatsink may prevent the bus bar assembly from moving due to external impact. Accordingly, it is possible to effectively prevent the contact coupling between the bus bar mounted to the bus bar assembly and the electrode leads of the plurality of secondary batteries of the cell assembly from being released.

Further, according to an embodiment of the present disclosure, since an open hole is formed at the heat-shrinkable tube such that the inlet tube and the outlet tube of the heatsink are exposed outward, the coolant supply device for supplying a coolant may be easily connected to the heatsink. Moreover, since the inlet tube and the outlet tube of the heatsink are inserted into the open hole of the heat-shrinkable tube, the heat-shrinkable tube may be stably fixed to the outer surface of the bus bar frame.

In addition, according to an embodiment of the present disclosure, since the heat-shrinkable tube includes a plurality of embossing structures formed at an outer surface thereof, it is possible to effectively absorb external impact and minimize the impact applied to the cell assembly accommodated therein, thereby effectively increasing the safety and durability of the battery module.

Further, according to an embodiment of the present disclosure, since a thermally conductive adhesive is added to be interposed between the cell assembly and the heatsink, the empty space that may be generated between the plurality of secondary batteries and the heatsink may be minimized, thereby reducing the amount of air occupied in the empty space. Also, since the thermal conductivity of heat generated from the secondary batteries may be significantly increased, the cooling efficiency of the battery module may be improved.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
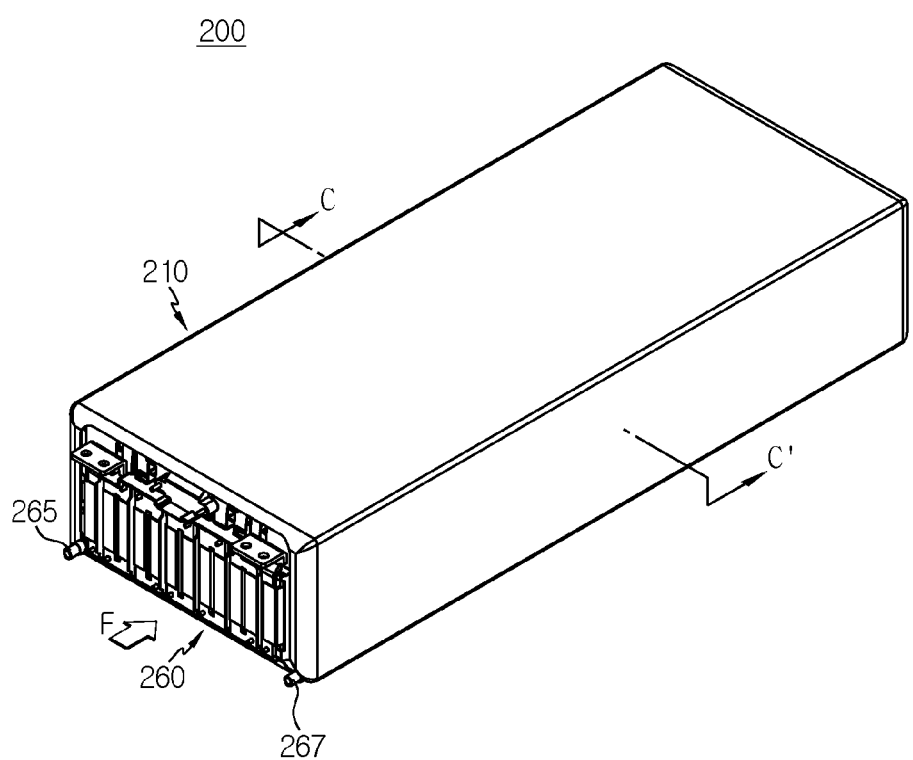
FIG. 1 is a perspective view schematically showing a battery module according to an embodiment of the present disclosure.
Figure 2:
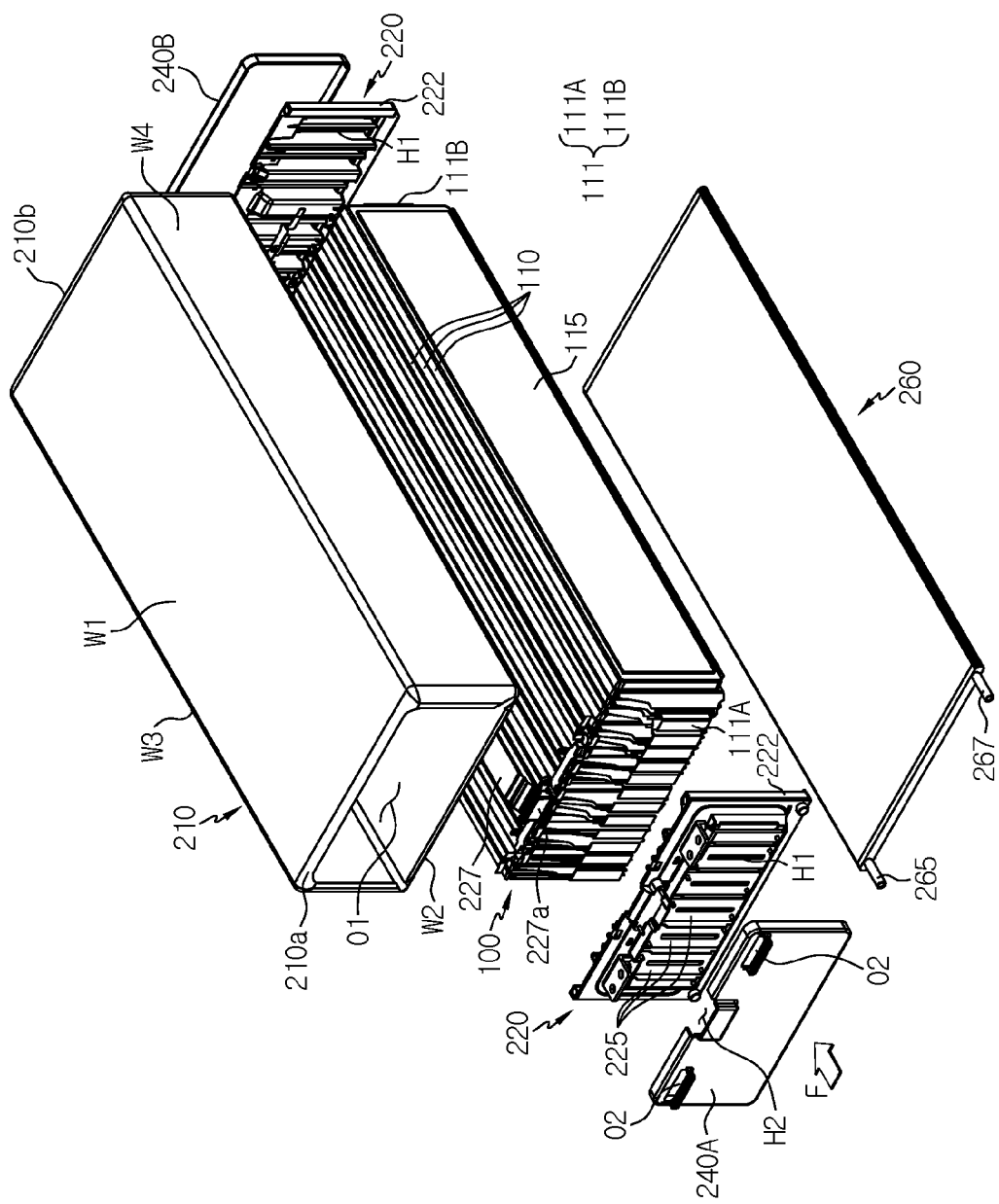
FIG. 2 is an exploded perspective view schematically showing the battery module according to an embodiment of the present disclosure.

FIG. 1 is a perspective view schematically showing a battery module according to an embodiment of the present disclosure. FIG. 2 is an exploded perspective view schematically showing the battery module according to an embodiment of the present disclosure. In addition, FIG. 3 is a side view schematically showing a pouch-type secondary battery, employed at the battery module according to an embodiment of the present disclosure.

Here, in FIG. 1, module covers 200A, 200B (FIG. 2) are not depicted in order to show inner components of a battery module 200 more exactly.

Figure 3:
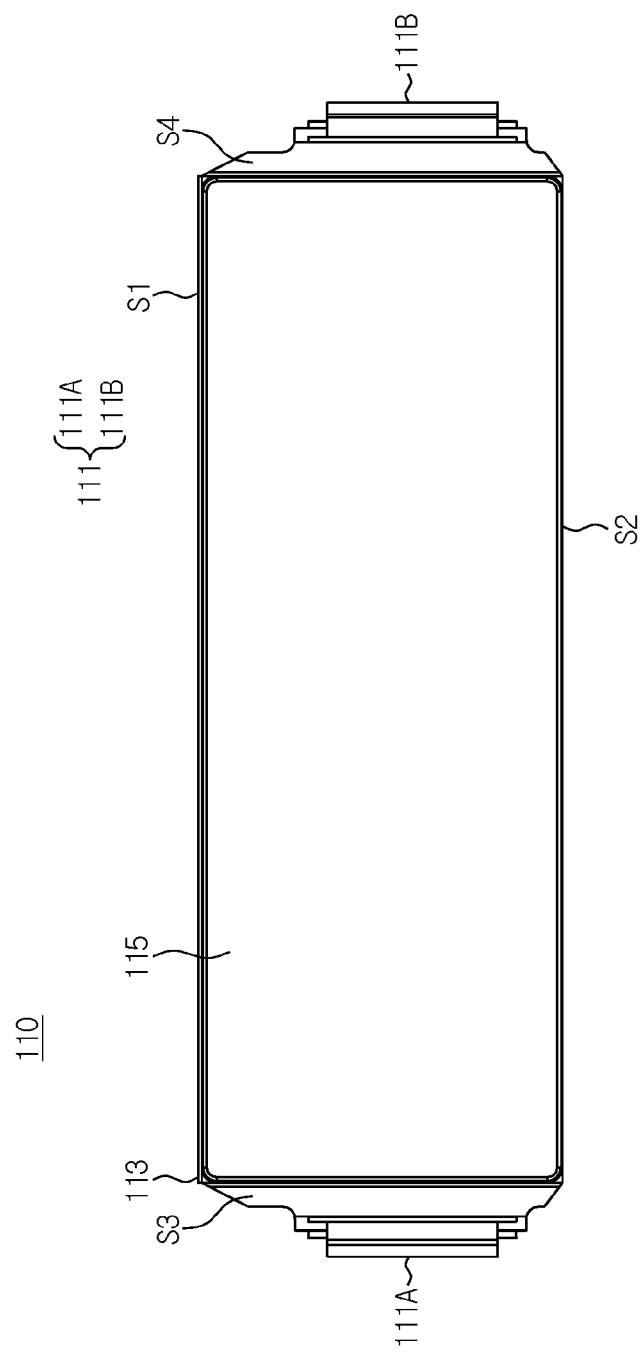
FIG. 3 is a side view schematically showing a pouch-type secondary battery, employed at the battery module according to an embodiment of the present disclosure.

Referring to FIGS. 1 to 3, a battery module 200 of the present disclosure may include a cell assembly 100, a heatsink 260, two module covers 240A, 240B, and a heat-shrinkable tube 210.

Here, the cell assembly 100 may include a plurality of secondary batteries 110.

At this time, the secondary battery 110 may be a pouch-type secondary battery 110. In particular, the pouch-type secondary battery 110 may include an electrode assembly (not shown), an electrolyte (not shown) and a pouch exterior 113.

Here, the electrode assembly may be configured such that at least one positive electrode plate and at least one negative electrode plate are disposed with a separator interposed therebetween. More specifically, the electrode assembly may be classified into a wound type in which one positive electrode plate and one negative electrode plate are wound together with a separator, a stacking type in which a plurality of positive electrode plates and a plurality of negative electrode plates are alternately stacked with a separator interposed therebetween, and the like.

Also, the pouch exterior 113 may be configured to have an outer insulating layer, a metal layer and an inner adhesive layer. The pouch exterior 113 may be configured to include a metal thin film, for example an aluminum thin film, in order to protect inner components such as the electrode assembly and the electrolyte, to enhance electrochemical properties by the electrode assembly and the electrolyte, and to improve heat dissipation. In addition, the aluminum thin film may be interposed between insulating layers made of an insulating material so as to secure electrical insulation with components inside the secondary battery 110 such as the electrode assembly and the electrolyte or with other components outside the secondary battery 110.

In particular, the pouch exterior 113 may be composed of two pouches, at least one of which may have a concave inner space formed therein. In addition, the electrode assembly may be accommodated in the inner space of the pouch. Further, sealing portions S1, S2, S3, S4 are provided at outer circumferential surfaces of two pouches, and the sealing portions S1, S2, S3, S4 of the two pouches are fused to each other to seal the inner space in which the electrode assembly is accommodated.

Each pouch-type secondary battery 110 may include an electrode lead 111 protruding in the front and rear direction, and the electrode lead 111 may include a positive electrode lead 111A and a negative electrode lead 111B.

In more detail, the electrode lead 111 may be configured to protrude forward or rearward from the sealing portions S3, S4 located at the outer circumference of the front or rear side of the pouch exterior 113. In addition, the electrode lead 111 may serve as an electrode terminal of the secondary battery 110.

For example, as shown in FIG. 2, one electrode lead 111 may be configured to protrude forward from the secondary battery 110, and the other electrode lead 111 may configured to protrude rearward from the secondary battery 110.

Thus, according to this configuration of the present disclosure, in one secondary battery 110, there is no interference between the positive electrode lead 111A and the negative electrode lead 111B, thereby widening the area of the electrode lead 111. In addition, a welding process between the electrode lead 111 and a bus bar 225 may be performed more easily.

In addition, a plurality of pouch-type secondary batteries 110 may be included in the battery module 200 and arranged to be stacked in at least one direction. For example, as shown in FIG. 2, a plurality of pouch-type secondary batteries 110 may be stacked side by side on each other in a right and left direction. At this time, each pouch-type secondary batteries 110 may be disposed to stand approximately perpendicular to the ground, when being observed in the F direction, such that two broad surfaces are located at right and left sides, respectively, and the sealing portions S1, S2, S3, S4 are located at upper, lower, front and rear sides. In other words, each secondary battery 110 may be configured to stand in an upper and lower direction.

Meanwhile, the terms indicating directions such as front, rear, left, right, upper and lower directions used herein may be changed depending on the position of an observer or the shape of an object. For the sake of convenience of description, in the present specification, directions are classified into front, rear, left, right, upper and lower directions, based on the F direction.

The configuration of the pouch-type secondary battery 110 described above is obvious to those skilled in the art and thus will not be described in detail here. In addition, the cell assembly 100 according to the present disclosure may employ various kinds of secondary batteries known at the time of filing of this application.

Figure 4:
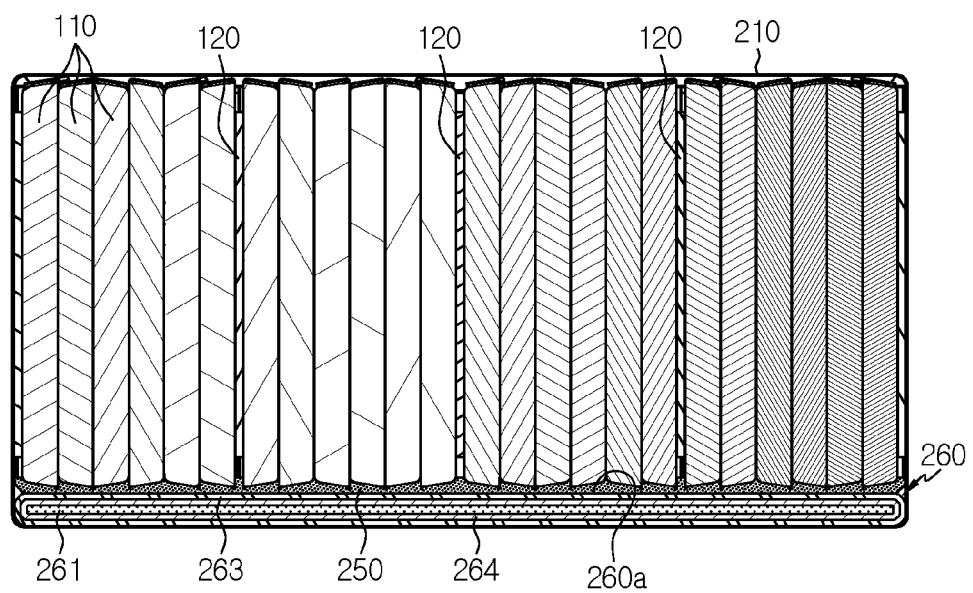
FIG. 4 is a side-sectioned view schematically showing a portion of a side surface of the battery module, taken along the line C-C' of FIG. 1.

FIG. 4 is a side-sectioned view schematically showing a portion of a side surface of the battery module, taken along the line C-C' of FIG. 1.

Meanwhile, referring to FIG. 4 along with FIGS. 1 and 2, the heatsink 260 may be located to contact the outer surface of the cell assembly 100. Specifically, the heatsink 260 may be located to contact the lower surface of the cell assembly 100.

In addition, the heatsink 260 may have a coolant flow path 264 formed therein so that a coolant 261 moves therein. For example, the heatsink 260 may have a box form with an empty inside and a metal outer wall 263. Further, the coolant flow path 264 of the heatsink 260 may have an inner wall that forms a flow path through which the coolant moves.

Moreover, the coolant 261 may be contained in the heatsink 260 or may be continuously supplied to the outside. For example, the coolant 261 may be water, Freon coolant, ammonia, acetone, methanol, ethanol, naphthalene, sulfur or mercury.

Further, the heatsink 260 may include an outer wall 263 to form a tubular structure. In addition, the outer wall 263 may be made of a material with high thermal conductivity. For example, the material with high thermal conductivity may be aluminum or copper.

In another embodiment, the heatsink 260 may include a heat accumulation unit (not shown) that absorbs heat generated from the secondary battery 110 to vaporize the coolant, and a heat dissipation unit (not shown) where the coolant vaporized at the heat accumulation unit is liquefied by releasing heat to the outside.

Meanwhile, referring to FIGS. 1 and 2 again, the heat-shrinkable tube 210 may have a form shrunken by heat of a predetermined temperature. For example, heat may be applied to the heat-shrinkable tube 210 using a dryer (a heater) so that air of a predetermined temperature comes into contact with the heat-shrinkable tube 210. Alternatively, radiant heat generated through an external device may be transferred to the heat-shrinkable tube 210.

Further, the heat-shrinkable tube 210 may have a heat shrinkable material whose volume is reduced at a particular temperature. For example, the heat-shrinkable tube 210 may be made using a polyester resin, a polyolefin resin or a polyphenylene sulfide resin. More specifically, the heat-shrinkable tube 210 may include at least one of polyvinyl chloride, polystyrene, polyethylene terephthalate (PET), polyolefin, nylon, polyvinyl chloride (PVC) and polybutylene terephthalate (PBT).

In addition, the heat-shrinkable tube 210 may have a tubular shape in which a hollow structure is formed. For example, as shown in FIG. 2, the heat-shrinkable tube 210 may have a hollow structure penetrated in the front and rear direction. That is, the heat-shrinkable tube 210 may have a tubular shape extending in the front and rear direction.

Moreover, the cell assembly 100 and the heatsink 260 may be located in the hollow structure of the heat-shrinkable tube 210. In this case, the heat-shrinkable tube 210 may be configured to surround a portion of the outer surface of the cell assembly 100 and the heatsink 260. Specifically, when viewed in the F direction, the heat-shrinkable tube 210 may be configured to be in close contact with a portion of the accommodation portion 115 of the secondary battery 110 located at the outermost side in the left and right direction among the plurality of pouch-type secondary batteries 110. That is, the heat-shrinkable tube 210 may be thermally shrunken by applying heat in a state where the cell assembly 100 and the heatsink 260 are accommodated therein, and the thermally shrunken portion of the heat-shrinkable tube 210 may be in close contact with a portion of the cell assembly 100.

Further, the heat-shrinkable tube 210 may have a sidewall to protect the cell assembly 100 from external impact. For example, the heat-shrinkable tube 210 may have a sidewall that forms an inner space for accommodating the cell assembly 100. Specifically, the sidewall may include an upper wall W1, a right wall W4, a left wall W3 and a lower wall W2 formed at upper, lower, left and right sides.

For example, as shown in FIGS. 1 and 2, the right wall W4 of the heat-shrinkable tube 210 may be configured to be in close contact with the outer surface of the accommodation portion 115 of the secondary battery 110 located at the rightmost end of the cell assembly 100. In addition, the left wall W3 of the heat-shrinkable tube 210 may be configured to be in close contact with the outer surface of the accommodation portion 115 of the secondary battery 110 located at the leftmost end of the cell assembly 100.

Further, the heat-shrinkable tube 210 may be thermally shrunken such that the cell assembly 100 and the heatsink 260 are in close contact with each other. That is, the heat-shrinkable tube 210 may be thermally shrunken by applying heat in a state where the cell assembly 100 and the heatsink 260 are accommodated inside the hollow structure. At this time, the sidewall of the heat-shrinkable tube 210 may press a portion of the outer surface of the cell assembly 100 and the heatsink 260 in the inner direction of the battery module 200. Here, the 'inner direction' refers to a direction from the outside toward the center of the inside of the battery module.

Thus, according to this configuration of the present disclosure, since the heat-shrinkable tube 210 is thermally shrunken by applying heat in a state where the cell assembly 100 and heatsink 260 are accommodated in the hollow structure and the thermally shrunken outer wall allows the cell assembly 100 and the heatsink 260 to be in close contact with each other, the spaced distance between the cell assembly 100 and the heatsink 260 is reduced and the contact area is increased, thereby realizing a uniform heat conduction distance between the cell assembly 100 and the heatsink 260 as a whole.

As a result, the battery module 200 of the present disclosure may quickly discharge the heat generated during the operation of the battery module 200 to the outside through the heatsink 260 in close contact therewith with high thermal conductivity, and the plurality of secondary batteries 110 of the cell assembly are thermally balanced, thereby maximizing the life of the battery module 200.

Further, the heat-shrinkable tube 210 may include a transparent material. Accordingly, if the battery module 200 includes the voltage sensing member 227, the state of the voltage sensing member 227 and the cell assembly 100 accommodated in the heat-shrinkable tube 210 may be visually checked, thereby facilitating the maintenance of the battery module 200.

Figure 5:
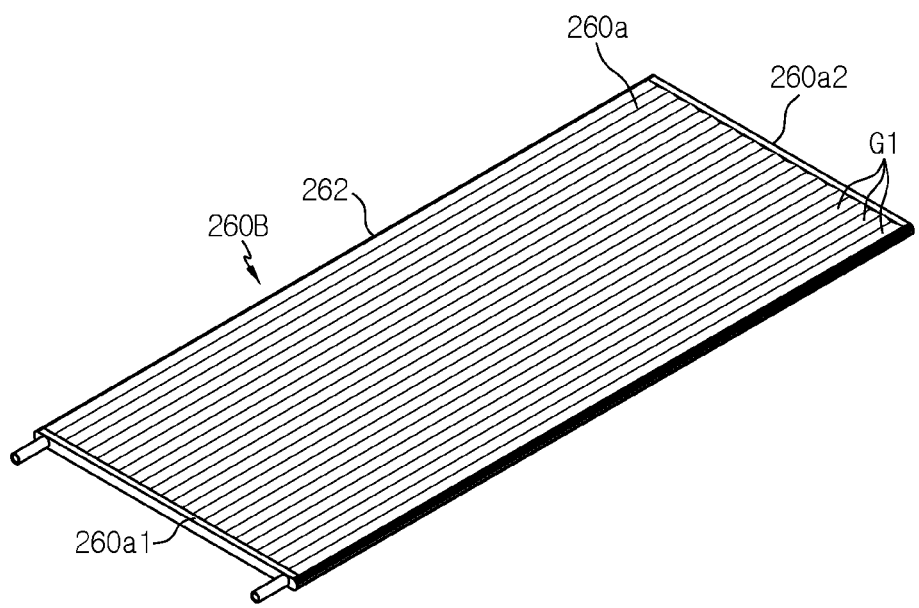
FIG. 5 is a perspective view schematically showing a heatsink, employed at the battery module according to another embodiment of the present disclosure.

FIG. 5 is a perspective view schematically showing a heatsink, employed at the battery module according to another embodiment of the present disclosure.

Referring to FIG. 5 along with FIG. 2, compared to the heatsink 260 shown in FIG. 2, the heatsink 260B shown in FIG. 5 may have an accommodation groove G1 dented inward and formed at an outer surface 260a thereof, which faces the cell assembly 100. In addition, the accommodation groove G1 of the heatsink 260B may have a dented size to accommodate a lower portion of each of the plurality of pouch-type secondary batteries 110 of the cell assembly 100. Here, the 'inner direction' refers to a direction toward the inside of the heatsink 260 from the outside.

For example, as shown in FIG. 2, 24 pouch-type secondary batteries 110 of the cell assembly 100 may be mounted to the upper surface 260a of the heatsink 260B. Also, as shown in FIG. 5, 24 accommodation grooves G1 dented inward may be formed at the upper surface 260a of the heatsink 260B to face the 24 pouch-type secondary batteries 110 of the cell assembly 100. In this case, the 24 accommodation grooves G1 may have a shape extending from a front end 260a1 of the upper surface 260a of the heatsink 260B to a rear end 260a2 thereof.

Thus, according to this configuration of the present disclosure, as the accommodation groove G1 dented inward direction is formed at the outer surface 260a of the heatsink 260B facing the cell assembly 100, the plurality of pouch-type secondary batteries 110 of the cell assembly 100 pressurized by the outer sidewall of the thermally shrunken heat-shrinkable tube 210 may be in close contact with the accommodation grooves G1 of the heatsink 260B in a wider contact area. Accordingly, the heat dissipation efficiency of the battery module 200 may be increased, and the plurality of pouch-type secondary batteries 110 of the cell assembly 100 may be prevented from moving due to external impact at the outer surface 260a of the heatsink 260B.

Figure 6:
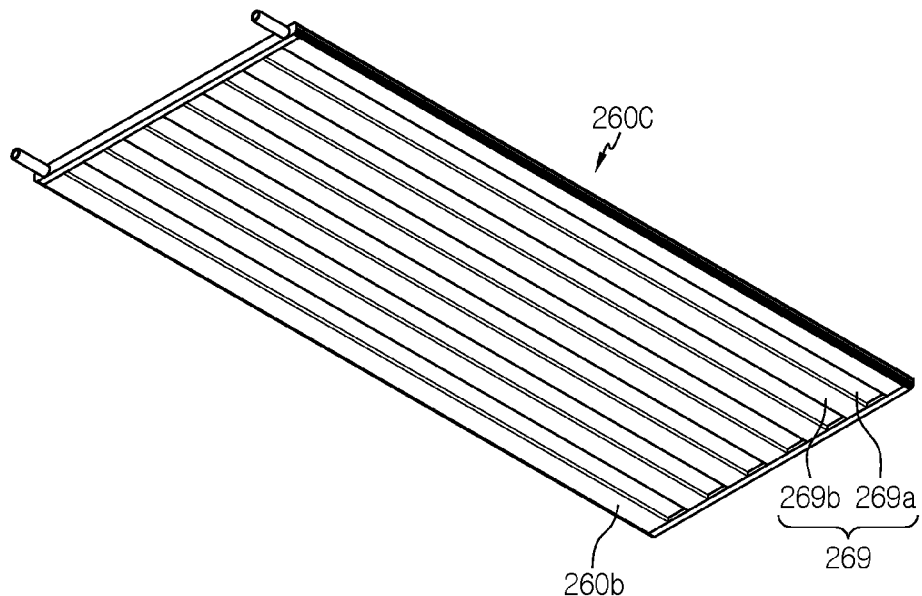
FIG. 6 is a perspective bottom view schematically showing a heatsink, employed at the battery module according to still another embodiment of the present disclosure.

FIG. 6 is a perspective bottom view schematically showing a heatsink, employed at the battery module according to still another embodiment of the present disclosure.

Referring to FIG. 6 along with FIG. 2, compared to the heatsink 260 shown in FIG. 2, the heatsink 260C of FIG. 6 may further have an uneven structure 269 formed at the outer surface of the heatsink 260C facing the heat-shrinkable tube 210. For example, the uneven structure 269 may include a protrusion 269b protruding outward and an insert 269a dented inward. In addition, in the uneven structure 269, the protrusion 269b and the insert 269a may be formed alternately. Further, the outer surface of the protrusion 269b may have a curved shape or an angled shape.

Moreover, a portion (not shown) of the thermally shrunken heat-shrinkable tube 210 may be thermally shrunken to closely contact the outer surfaces of the protrusion 269b and the insert 269a of the uneven structure 269.

For example, as shown in FIG. 6, the uneven structure 269 may be formed at the lower surface 260b of the heatsink 260C facing the heat-shrinkable tube 210. In addition, the uneven structure 269 may include six protrusions 269b and six inserts 269a formed alternately.

Thus, according to this configuration of the present disclosure, since the uneven structure 269 is formed at the outer surface of the heatsink 260C facing the heat-shrinkable tube 210, the contact area between the heat-shrinkable tube 210 and the heatsink 260C may be effectively increased, and the heat-shrinkable tube 210 may be fixed to the insert 269a of the uneven structure 269.

Accordingly, the bonding force (the friction force) between the heat-shrinkable tube 210 and the heatsink 260C may be increased. In addition, the heatsink 260C located inside the hollow structure of the heat-shrinkable tube 210 may be prevented from moving due to external impact. Further, since the heatsink 260C increases the contact area with the heat-shrinkable tube 210 to efficiently transfer the heat generated from the cell assembly 100 to the heat-shrinkable tube 210, the heat dissipation efficiency of the battery module 200 may be further enhanced.

Meanwhile, referring to FIG. 2 again, the heatsink 260C may include an inlet tube 265 for injecting a coolant and an outlet tube 267 for discharging a coolant. At this time, a separate coolant supply device (not shown) for supplying a coolant to the heatsink 260C may be provided. Also, the coolant supply device may have a cooling unit (not shown) to cool the coolant discharged from outlet tube 267 of the heatsink 260C.

Figure 7:
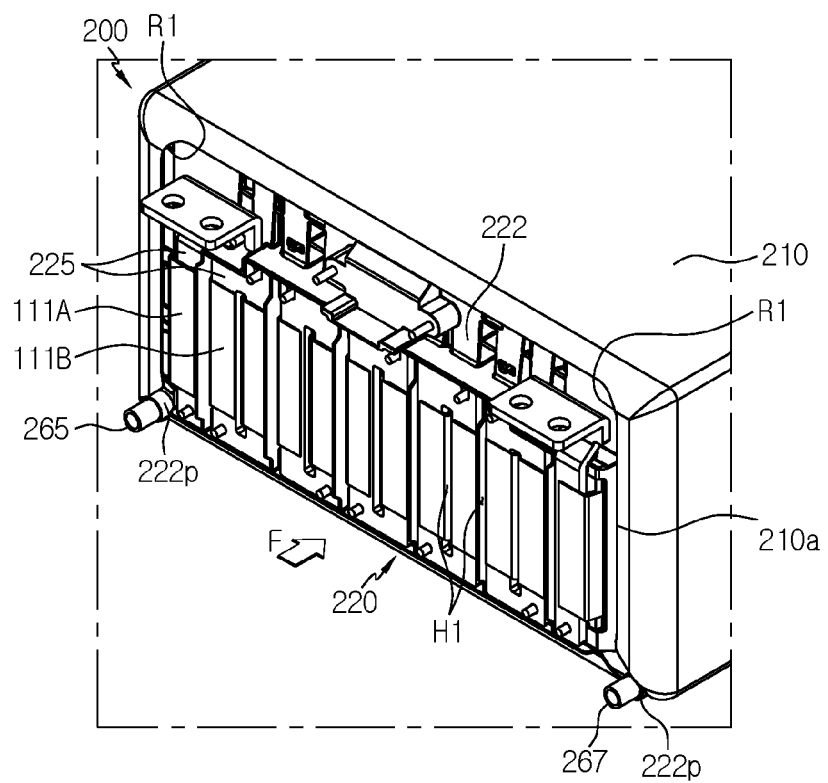
FIG. 7 is a perspective view schematically showing some components of the battery module according to an embodiment of the present disclosure.

FIG. 7 is a perspective view schematically showing some components of the battery module according to an embodiment of the present disclosure.

Meanwhile, referring to FIG. 7 along with FIGS. 1 and 2, the battery module 200 may further include a bus bar assembly 220 having a bus bar frame 222 and a bus bar 225 mounted to an outer surface of the bus bar frame 222.

Specifically, the bus bar assembly 220 may be located at a front side or a rear side of the cell assembly 100 at which the electrode leads 111 are formed. In addition, the bus bar assembly 220 may include a bus bar frame 222. Further, the bus bar frame 222 may include an electrically insulating material. For example, the electrically insulating material may be plastic.

Further, the bus bar assembly 220 may include a bus bar 225 having a conductive metal to electrically connect the plurality of pouch-type secondary batteries 110. For example, the conductive metal may be copper, copper alloy, aluminum, aluminum alloy, nickel, or the like. Also, the bus bar 225 may be mounted to an outer surface of the bus bar frame 222.

Specifically, the bus bar 225 may be mounted and fixed to the outer side of the bus bar frame 222. In addition, the bus bar 225 may be provided in plural so that the plurality of bus bars 225 are arranged side by side in a left and right direction at the outer surface of the bus bar frame 222. Further, the plurality of bus bars 225 may have different electrical polarities depending on the location of the bus bar frame 222.

Further, the bus bar frame 222 may have a perforation hole H1 through which at least one electrode lead 111 protrudes. Specifically, the ends of the plurality of electrode leads 111 may penetrate through the perforation hole H1 of the bus bar frame 222 to protrude from the secondary battery 110 in a front and rear direction. Accordingly, the perforation hole H1 may be located and sized such that the end of the electrode lead 111 inserted through the bus bar frame 222 is easily contacted and connected with a body of the bus bar 225.

In addition, the bus bar frame 222 may have a fixing structure opened so that the inlet tube 265 and the outlet tube 267 of the heatsink 260 are inserted and fixed therein, respectively. Specifically, the fixing structure may be a fixing tube 222p having an opening perforated in a portion of the bus bar frame 222 in a front and rear direction.

Further, the fixing tube 222p may have a tubular shape with a hollow structure. The fixing tube 222p may have a diameter that allows the inlet tube 265 and the outlet tube 267 of the heatsink 260 to be inserted and fixed therein. In addition, the fixing tube 222p may be formed at a portion of the bus bar frame 222 located corresponding to the inlet tube 265 and the outlet tube 267.

For example, as shown in FIG. 7, two fixing structures may be formed at left and right sides of the lower end of the bus bar frame 222, located corresponding to the inlet tube 265 and the outlet tube 267 of the heatsink 260, respectively. In addition, the fixing tube 222p may be formed at each of the two fixing structures.

Thus, according to this configuration of the present disclosure, since the fixing structure opened so that the inlet tube 265 and the outlet tube 267 of the heatsink 260 are respectively inserted and fixed therein is formed at the bus bar frame 222 of the bus bar assembly 220, the heatsink 260 may prevent the bus bar assembly 220 from moving due to external impact. Accordingly, it is possible to effectively prevent the contact coupling between the bus bar 225 mounted to the bus bar assembly 220 and the electrode leads 111 of the plurality of secondary batteries 110 of the cell assembly 100 from being released.

Referring to FIG. 2 again, the battery module 200 of the present disclosure may include two module covers 240A, 240B configured to cover the outer surfaces of the bus bar assemblies 220 located at a front side and a rear side thereof, respectively. Specifically, the module cover 240A located at the front side of the battery module 200 may be configured to cover at least a part of the outer portion of the bus bar assembly 220 except for external input/output terminal portions of the bus bar 225. That is, the external input/output terminal portions of the bus bar 225 may be shaped to protrude out through an opening O2 formed in the module cover 240A.

In addition, the module cover 240 may have an open portion H2 formed at an upper portion thereof so that a connector 227a configured to be electrically connected to an external BMS device of a voltage sensing member 227 may be exposed to the outside.

Also, the module cover 240B located at the rear side of the battery module 200 may be configured to cover the bus bar 225 mounted to the bus bar assembly 220.

Figure 8:
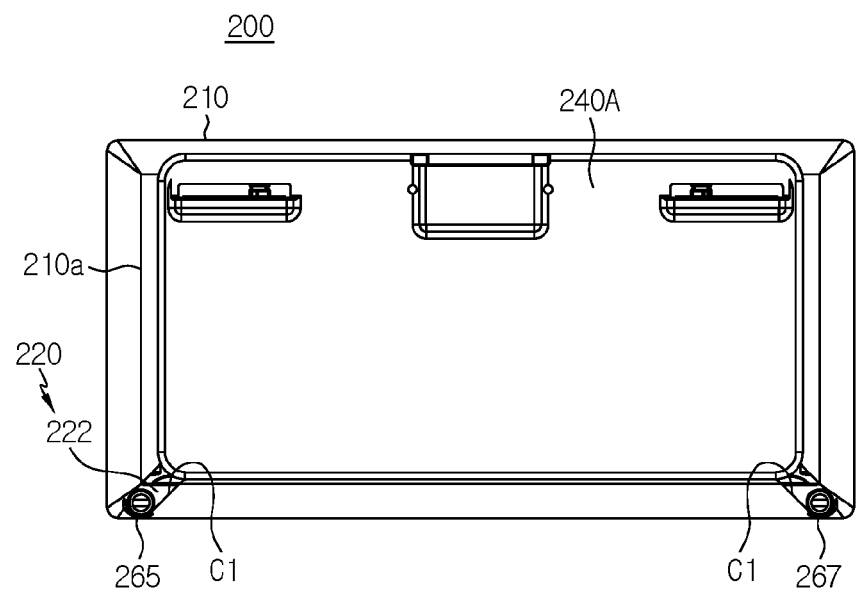
FIG. 8 is a front view schematically showing the battery module according to an embodiment of the present disclosure.

FIG. 8 is a front view schematically showing the battery module according to an embodiment of the present disclosure. In FIG. 8, the module cover 240A is coupled to the outer surface of the bus bar assembly 220, and the heat-shrinkable tube 210 covers a portion of the outer surface of the bus bar assembly 220.

Referring to FIG. 8 along with FIGS. 2 and 7, the heat-shrinkable tube 210 may be configured to surround a portion of the outer surface of the bus bar assembly 220. Specifically, the heat-shrinkable tube 210 may be configured to surround a portion of the outer surface of the bus bar frame 222 of the bus bar assembly 220.

For example, as shown in FIG. 8, when viewed in the F direction, the front end 210a of the heat-shrinkable tube 210 may surround an outer circumference of the outer surface of the bus bar frame 222 of the bus bar assembly 220. Also, though not shown in the figures, the rear end 210b (shown in FIG. 2) of the heat-shrinkable tube 210 may be configured to surround the outer circumference of the outer surface of the bus bar frame 222 located at the rear side of the cell assembly 100.

At this time, an open portion O1 (FIG. 2) formed at the front end 210a of the heat-shrinkable tube 210 may have a rectangular shape macroscopically. Further, a corner portion of the rectangular open portion O1 of the heat-shrinkable tube 210 may have a round shape R1.

In addition, a concave portion C1 dented inward may be formed at a portion of the heat-shrinkable tube 210 surrounding the outer surface of the bus bar assembly 220, such that the inlet tube 265 and the outlet tube 267 of the heatsink 260 are exposed to the outside.

For example, as shown in FIG. 8, if the inlet tube 265 and the outlet tube 267 of the heatsink 260 are located at both sides of the bus bar frame 222 in the lower left and right direction, two concave portions C1 dented inward may be respectively formed at both left and right sides of the lower portion of the heat-shrinkable tube 210 surrounding the outer surface of the bus bar assembly 220, to expose the inlet tube 265 and the outlet tube 267 of the heatsink 260 to the outside.

Thus, according to this configuration of the present disclosure, since the concave portion C1 capable of exposing the inlet tube 265 and the outlet tube 267 of the heatsink 260 is formed at the heat-shrinkable tube 210, the heatsink 260 may be easily connected to a coolant supply device that supplies a coolant to the heatsink 260.

Figure 9:
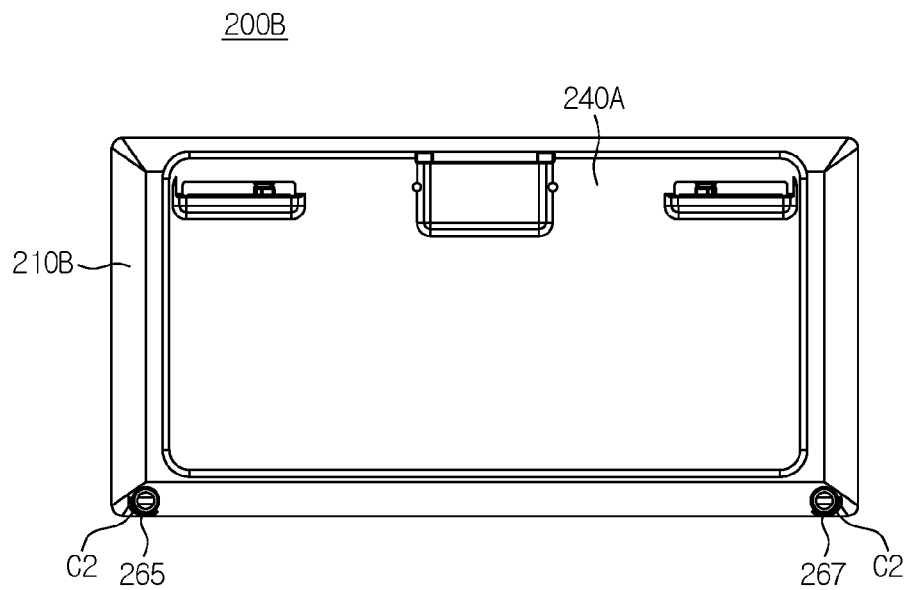
FIG. 9 is a front view schematically showing a battery module according to another embodiment of the present disclosure.

FIG. 9 is a front view schematically showing a battery module according to another embodiment of the present disclosure.

Referring to FIG. 9, an open hole C2 perforated to expose the inlet tube 265 and the outlet tube 267 of the heatsink 260 to the outside may be formed at a portion of the heat-shrinkable tube 210 surrounding the outer surface of the bus bar assembly 220.

For example, as shown in FIG. 9, if the inlet tube 265 and the outlet tube 267 of the heatsink 260 are located on both left and right sides of the lower portion of the bus bar frame 222, two open holes C2 perforated to expose the inlet tube 265 and the outlet tube 267 of the heatsink 260 to the outside may be formed at both left and right sides of the heat-shrinkable tube 210 surrounding the outer surface of the bus bar assembly 220, respectively.

Thus, according to this configuration of the present disclosure, since the open holes C2 perforated to expose the inlet tube 265 and the outlet tube 267 of the heatsink 260 are formed at the heat-shrinkable tube 210, the heatsink 260 may be easily connected to a coolant supply device that supplies a coolant to the heatsink 260. In addition, since the inlet tube 265 and outlet tube 267 of the heatsink 260 are inserted into the open holes C2 of the heat-shrinkable tube 210, the outer surface of the heat-shrinkable tube 210 may be stably fixed to the outer surface of the bus bar frame 222.

Figure 10:
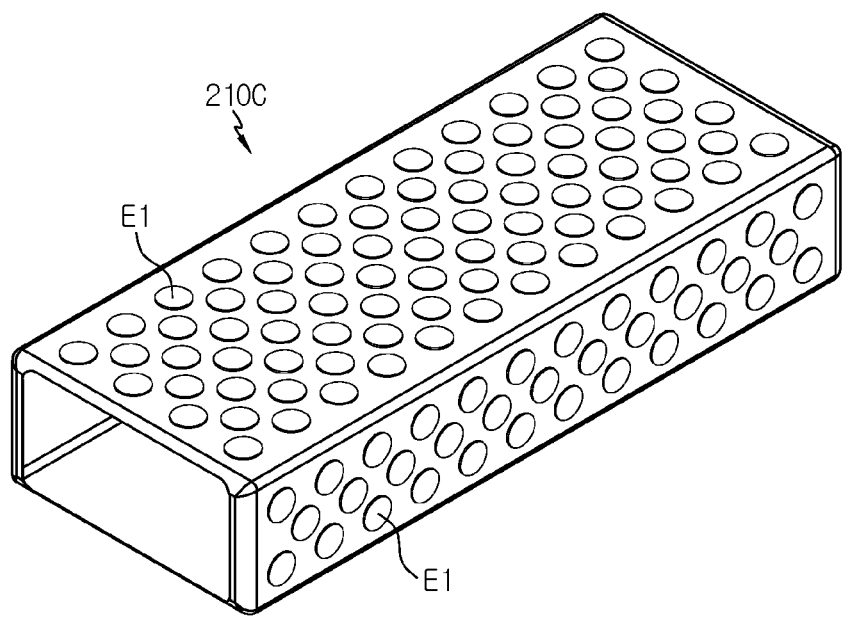
FIG. 10 is a perspective bottom view schematically showing a heat-shrinkable tube, employed at the battery module according to another embodiment of the present disclosure.

FIG. 10 is a perspective bottom view schematically showing a heat-shrinkable tube, employed at the battery module according to another embodiment of the present disclosure.

Referring to FIG. 10 along with FIG. 2, a plurality of embossing structures E1 partially ridged outward may be formed at the outer surface of the heat-shrinkable tube 210C, different from the heat-shrinkable tube 210 of FIG. 2. Specifically, the plurality of embossing structures E1 partially ridged outward may be formed at the outer surface of at least one outer surface, among the outer wall, the lower wall, the left wall and the right wall of the heat-shrinkable tube 210C.

In addition, the embossing structure E1 may be a portion having a relatively greater thickness in the outer direction than the remaining portion where the embossing structure E1 of the heat-shrinkable tube 210C is not formed.

In another embodiment, the embossing structure E1 may contain air therein and may be configured to have high elasticity as a whole. Alternatively, the embossing structure E1 may contain a material with high elastic force, such as rubber.

For example, as shown in FIG. 10, the plurality of embossing structures E1 having a greater thickness in the outer direction than the remaining portions may be formed at the outer wall of the heat-shrinkable tube 210C.

Thus, according to this configuration of the present disclosure, since the plurality of embossing structures E1 are further formed at the heat-shrinkable tube 210C, it is possible to effectively absorb external shocks and minimize impacts applied to the cell assembly 100 accommodated therein, thereby effectively improving the safety and durability of the battery module 200.

Referring to FIG. 4 again, the battery module 200 may include a thermally conductive adhesive 250 added in the heat-shrinkable tube 210. Here, the thermally conductive adhesive 250 may include a polymer resin or a silicon-based resin with high thermal conductivity and a filler. For example, the polymer resin may be a poly siloxane resin, a polyamide resin, a urethane resin or an epoxy resin. In addition, the thermally conductive adhesive 250 may include an adhesive material. For example, the adhesive material may be a material such as acrylic, polyester, polyurethane, rubber or the like.

In addition, the thermally conductive adhesive 250 may be added to be interposed between the cell assembly 100 and the heatsink 260. Specifically, the thermally conductive adhesive 250 may be added to contact the lower surface of the plurality of secondary batteries 110 of the cell assembly 100 and the upper surface of the heatsink 260. For example, as shown in FIG. 10, the thermally conductive adhesive 250 may be interposed between the lower portions of the 24 secondary batteries 110 and the upper surface 260a of the heatsink 260.

Thus, according to this configuration of the present disclosure, since the thermally conductive adhesive 250 is added to be interposed between the cell assembly 100 and the heatsink 260, the empty space created between the plurality of secondary batteries 110 and the heatsink 260 may be minimized, thereby reducing an amount of air occupied by the empty space. Also, since the thermal conductivity of heat generated from the secondary batteries 110 may be dramatically increased, it is possible to improve the cooling efficiency of the battery module 200.

In addition, the cell assembly 100 may include a buffering pad 120 interposed between the plurality of secondary batteries 110. Specifically, the buffering pad 120 may have a material whose volume is easily changed according to an external pressing force. For example, the material of the buffering pad 120 may be a sponge or a nonwoven fabric. For example, as shown in FIG. 4, three buffering pads 120 may be interposed between the 24 secondary batteries.

Therefore, according to this configuration of the present disclosure, when the battery module of the present disclosure is charged or discharged, the buffering pad 120 may absorb the force caused by the volume change of the plurality of secondary batteries of the cell assembly, thereby giving a buffer function. Accordingly, it is possible to prevent the cell assembly located inside the heat-shrinkable tube from moving.

Figure 11:
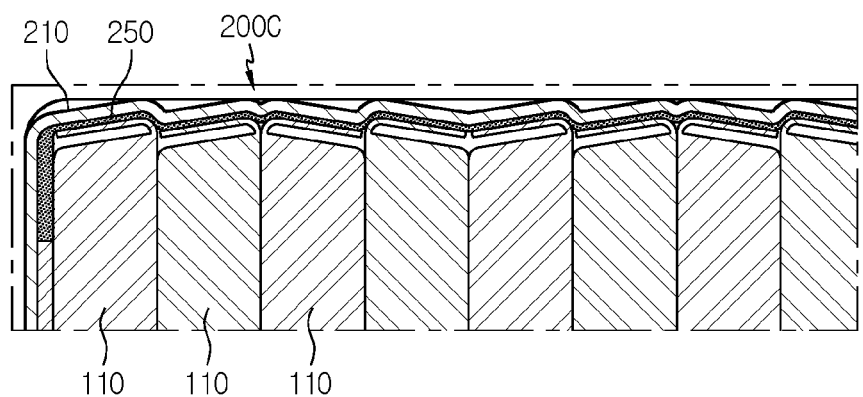
FIG. 11 is a side-sectioned view schematically showing a portion of a cut side surface of a battery module according to still another embodiment of the present disclosure.

FIG. 11 is a side-sectioned view schematically showing a portion of a cut side surface of a battery module according to still another embodiment of the present disclosure.

Referring to FIG. 11 along with FIG. 2, the thermally conductive adhesive 250 may be added to be interposed between the cell assembly 100 and the heat-shrinkable tube 210. Specifically, the thermally conductive adhesive 250 may be added to be interposed between the plurality of secondary batteries 110 of the cell assembly 100 and the heat-shrinkable tube 210. In addition, the heat-shrinkable tube 210 may be formed to cover an upper side and a horizontal side of the plurality of pouch-type secondary batteries 110.

For example, as shown in FIG. 11, in the battery module 200C, the thermally conductive adhesive 250 may be added to be interposed between the plurality of secondary batteries 110 of the cell assembly 100 and the heat-shrinkable tube 210. In addition, the thermally conductive adhesive 250 may have a shape extending along the outer surface of the plurality of pouch-type secondary batteries 110.

Thus, according to this configuration of the present disclosure, if the thermally conductive adhesive 250 is added between the cell assembly 100 and the heat-shrinkable tube 210, the empty space formed between the heat-shrinkable tube 210 and the plurality of secondary batteries 110 may be minimized, thereby reducing an amount of air occupied by the empty space. Also, since the thermal conductivity of heat generated from the secondary batteries 110 may be dramatically increased, it is possible to improve the cooling efficiency of the battery module 200.

Further, referring to FIG. 1, a battery pack (not shown) according to the present disclosure may include at least one battery module 200 according to the present disclosure. In addition, the battery pack according to the present disclosure may further include, in addition to the battery module 200, a pack case for accommodating the battery module 200, and various devices for controlling charge and discharge of the battery module 200, for example a battery management system (BMS), a current sensor, a fuse and the like.

In addition, the battery pack according to the present disclosure may be applied to a vehicle (not shown) such as an electric vehicle. In other words, the vehicle according to the present disclosure may include the battery pack according to the present disclosure.

Further, the energy storage system (not shown) may store power generated by the power generation unit and supplying the power to a power grid. In addition, the power grid may be a commercial grid or a grid of a small district. Moreover, in some cases, the energy storage system may be a power storage device that stores power at smart grid, and the energy storage system may be a load or a power converter that directly consumes the produced power.

Meanwhile, even though the terms indicating directions such as upper, lower, left, right, front and rear directions are used in the specification, it is obvious to those skilled in the art that these merely represent relative positions for convenience in explanation and may vary based on a position of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| Reference Signs | |
|---|---|
| 200: battery module | 100: cell assembly |
| 110: pouch-type secondary battery | 111: electrode lead |
| 220: bus bar assembly | 222: bus bar frame |
| 225: bus bar | 240A, 240B: module cover |
| 210: heat-shrinkable tube | |
| W1, W2, W3, W4: outer wall, lower wall, left wall, right wall | |
| E1: embossing structure | 250: thermally conductive adhesive |
| 260: heatsink | 265, 267: inlet tube, outlet tube |
| 264: coolant flow path | 261: coolant |
| 222p: fixing tube | G1: accommodation groove |
| 269: uneven structure | |

INDUSTRIAL APPLICABILITY

The present disclosure relates to a battery module including a heat-shrinkable tube. Also, the present disclosure is applicable to industries related to a battery pack or a vehicle, which include the battery module.

What is claimed is:

1. A battery module, comprising:
a cell assembly including a plurality of pouch-type secondary batteries having electrode leads formed to protrude in a front and rear direction and stacked on each other in a left and right direction;
a heatsink located to contact an outer surface of the cell assembly and having a coolant flow path for allowing a coolant to move therein;
a heat-shrinkable tube having a tubular shape with a hollow structure in which the cell assembly and the heatsink are located, the heat-shrinkable tube being thermally shrunken so that the cell assembly and the heatsink are pressed into contact with each other by a force applied thereto by the heat-shrinkable tube; and
a bus bar assembly,
wherein the heatsink has an inlet tube for injecting a coolant and an outlet tube for discharging a coolant,
wherein the bus bar assembly includes a bus bar frame located at a front side or a rear side of the cell assembly at which an electrode lead is formed, the bus bar frame having a perforation hole through which at least one electrode lead passes and protrudes, the bus bar frame having a fixing structure opened so that the inlet tube and the outlet tube of the heatsink are respectively inserted and fixed therein, and
wherein a plurality of embossing structures partially ridged outward are formed at an outer surface of the heat-shrinkable tube, each embossing structure being a portion of the heat-shrinkable tube having first thickness greater than a second thickness of a remaining portion of the heat-shrinkable tube where the embossing structures are not formed.

2. The battery module according to claim 1,
wherein the heatsink has an accommodation groove formed to be dented inward to accommodate a lower portion of each of the plurality of pouch-type secondary batteries of the cell assembly.

3. The battery module according to claim 1,
wherein an uneven structure is formed at an outer surface of the heatsink, which faces the heat-shrinkable tube.

4. The battery module according to claim 1,
wherein the bus bar assembly further includes:
a bus bar mounted to an outer surface of the bus bar frame and having a conductive metal to electrically connect the plurality of pouch-type secondary batteries.

5. The battery module according to claim 1,
wherein the heat-shrinkable tube is configured to surround a portion of the outer surface of the bus bar assembly, and
wherein a concave portion dented inward is formed at a portion of the heat-shrinkable tube surrounding the outer surface of the bus bar assembly so that the inlet tube and the outlet tube of the heatsink are exposed outward.

6. The battery module according to claim 1,
wherein a thermally conductive adhesive is added in the heat-shrinkable tube.

7. The battery module according to claim 6,
wherein the thermally conductive adhesive is interposed between the cell assembly and the heatsink.

8. The battery module according to claim 6,
wherein the thermally conductive adhesive is interposed between the cell assembly and the heat-shrinkable tube.

9. A battery pack, comprising at least one battery module according to claim 1.

10. A vehicle, comprising the battery pack according to claim 9.

11. The battery module according to claim 1, further comprising:
a module cover configured to cover an outer surface of the bus bar assembly.

12. The battery module according to claim 11,
wherein the module cover is configured to cover at least a part of an outer portion of the bus bar assembly except for an external input/output terminal portion of the bus bar.

13. The battery module according to claim 1,
wherein at least one of the plurality of embossing structures contains air therein.

14. The battery module according to claim 1,
wherein the cell assembly includes a buffering pad interposed between two of the plurality of pouch-type secondary batteries.

* * * * *